No. 608,160. Patented July 26, 1898.
J. E. SNELLING.
ROLLER STEAK HACKER.
(Application filed May 11, 1897.)
(No Model.)

Witnesses
James F. Duhamel
C. D. Kesler

Inventor
JESSE E. SNELLING,
by John Wedderburn
Attorney

THE NORRIS PETERS CO., PHOTO-LITHO., WASHINGTON, D. C.

UNITED STATES PATENT OFFICE.

JESSE ELMER SNELLING, OF NEWARK, OHIO.

ROLLER STEAK-HACKER.

SPECIFICATION forming part of Letters Patent No. 608,160, dated July 26, 1898.

Application filed May 11, 1897. Serial No. 635,979. (No model.)

*To all whom it may concern:*

Be it known that I, JESSE ELMER SNELLING, a citizen of the United States, residing at Newark, in the county of Licking and State of Ohio, have invented certain new and useful Improvements in Meat-Tenderers, of which the following is a specification.

The object of my invention is to provide an improved machine for cutting or hacking meat in such manner as to make it more tender without reducing it to fragments.

According to my invention I provide two gangs of circular or disk cutters mounted on horizontal shafts and arranged in vertical planes, between which the meat is fed. Below the disk cutters I arrange two cylindrical gangs of cutters, consisting of longitudinal blades mounted on horizontal shafts just below the shafts of the disk cutters, and below the longitudinal cutters I arrange two gangs of rotary cleaning and guiding blades mounted on horizontal axes and geared to turn in directions opposite to the directions in which the longitudinal blades rotate and adapted to prevent the meat from being carried around by the blades and to clear these blades of any meat that may be adhering thereto.

There is a hopper at the top of the machine, into which the meat is fed, and a drawer or receptacle at the bottom of the apparatus, into which the meat drops after it has been acted on by the hacking devices.

Figure 1:
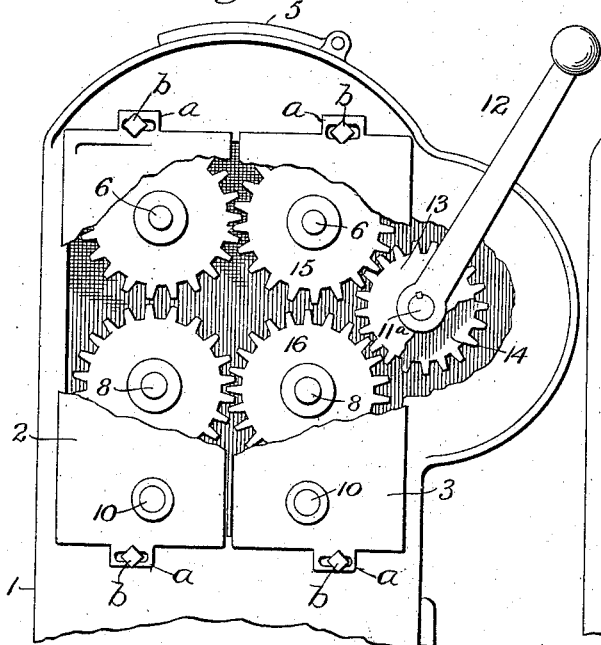
Figure 3:
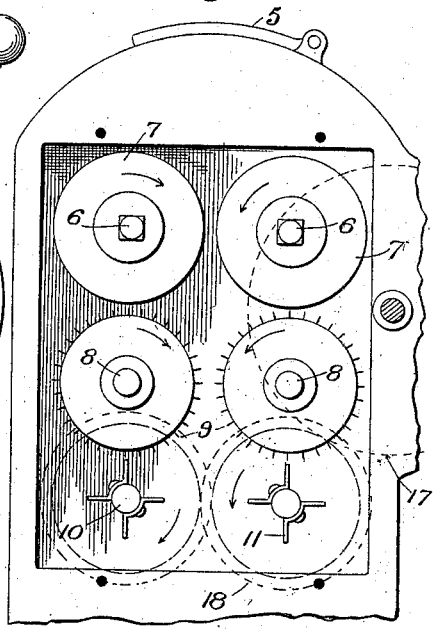
Figure 2:
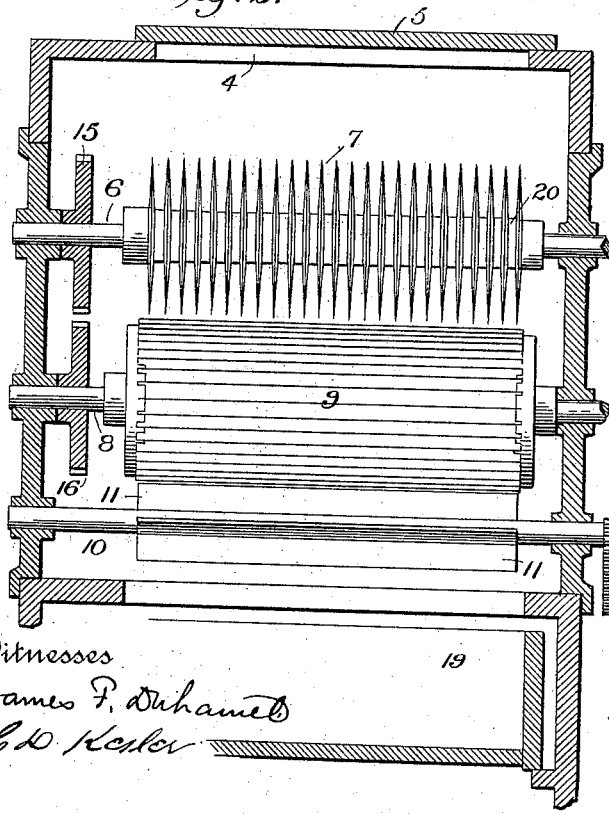
Figure 4:
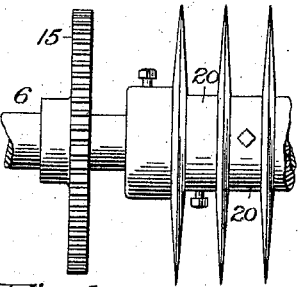
Figure 5:
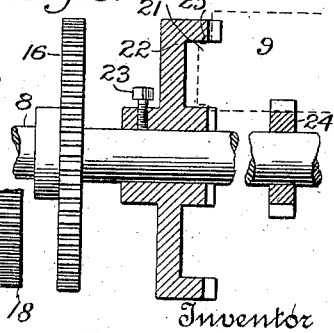

In the accompanying drawings, Figure 1 is an end elevation (with the casing broken away to show part of the gearing) of the upper part of a meat-tendering machine embodying my improvements. Fig. 2 is a vertical longitudinal central section thereof, some of the gearing being shown in section. Fig. 3 shows an end view of the machine opposite to that shown in Fig. 1 with part of the casing removed to show the mechanism within. Fig. 4 is an enlarged detail view showing the manner of mounting the disk cutters on their shafts. Fig. 5 is a detail view showing the manner of mounting the longitudinal blades or cutters on their shafts.

The main casing 1 may be of any suitable construction to inclose the operative parts of the machine. A hopper is formed at the top of the machine, which is provided with an opening 4, through which the meat is fed. The hopper has a hinged lid 5, that may be readily opened and closed. The casing is closed at front and rear. At opposite ends it is provided with removable or adjustable plates 2 and 3, which carry the bearings of the shafts 6, 8, and 10, in which the disk cutters, longitudinal cutters, and cleaning and guiding blades are respectively mounted. These plates are provided with slotted lugs $a$, through which extend set-screws $b$, that enter sockets in the main casing. The plates may be adjusted toward and from each other horizontally to adjust the distance between the shafts of the gangs of cutters and cleaning-blades.

The gear-wheels hereinafter referred to have long teeth, which permit of the desired adjustment. The circular knives or disks 7 are mounted on the shafts 6 in any suitable way to hold them at proper distances apart, as shown in Fig. 2, and to prevent them from turning relatively to the shafts.

The shafts are preferably square to receive square openings in the disk, and the blades are separated by collars 20. Collars provided with set-screws are provided at the ends of the shafts to prevent endwise movement. Any other suitable way may be adopted for mounting the blades on their shafts, for holding them proper distances apart, and for preventing endwise or longitudinal movement.

The longitudinal blades 9 are secured to their shaft 8 in any suitable way. They are arranged radially relatively to the axis of the shaft. Preferably the blades are secured in position as indicated in Fig. 5, one of the blades being shown in dotted lines.

At each end of the shaft I secure a disk or collar 22 by means of a set-screw 23 or other suitable device. This collar has a flange 25, which is slotted to receive the blades, and the blades are shouldered at 21 to prevent them from moving outward radially. The inner ends of the blades may also rest in sockets formed in the hubs of the collars.

24 indicates a radially-slotted hub preferably placed midway between the collars at the opposite ends of the knives. The inner ends of the blades extend through the slots in the collar 24. By this arrangement the blades are held at proper distances apart and are prevented from endwise movement or radial movement outward.

The shafts 10 carry radially-arranged longitudinal blades 11 equal in length to the blades 9, and the edges of which move in close proximity to the blades 9.

The circular cutters 7 are arranged to move in opposite directions, those portions above the shaft moving toward the center of the machine. Likewise the blades 9 move in opposite directions, those above the shafts 8 moving toward the center of the machine, the effect being to draw the material fed between the blades 7 inwardly and feed it downwardly.

The guiding and cleaning blades 11 are operated in such manner as to revolve in a direction opposite to the direction of revolution of the blades 9—that is to say, the blades 9 below the shafts 8 on both sides of the machine move away from the center of the machine, while the blades 11 when above the shafts 10 move inwardly toward the center of the machine, the effect being to force back the meat that tends to move outwardly and to thoroughly clear the blades 9 from any pieces of meat that may be adhering thereto.

The blades 11 perform the double function of guiding or directing the meat as it is delivered from the blades 9 and also clearing the blades 9 of pieces of meat that may adhere thereto. Without the use of the blades 11 the blades 9 might be so firmly attached to the meat that the meat would be wrapped around one of the rollers—that is to say, the meat might adhere to the blades on the right-hand side of the machine as viewed in Fig. 3, and instead of falling down into the drawer below might be carried out under the shaft 8 at the right and off to one side and perhaps might be carried up again and thus wrapped around the shaft 8. The blades 11, however, prevent the meat from doing this. If the blades 11 move in the same direction as the blades 9, they would assist the blades 9 in carrying the meat off laterally and causing it to be wrapped around the shaft 8; but by turning in an opposite direction they prevent this tendency.

The shafts may be geared and operated in any suitable way. As shown, a crank-handle 12 is rigidly secured to a horizontally-arranged main driving-shaft 11$^a$, mounted in bearings in the frame. On the shaft 11$^a$, close to the crank, but inside the frame, are secured pinions 13 and 14, which mesh, respectively, with pinions 15 and 16 on the adjacent shafts 6 and 8. The pinions 15 and 16 mesh with corresponding pinions on the shafts 6 and 8 on the opposite side of the machine. At the opposite end of the shaft 11$^a$, outside the casing, is secured a large spur-gear 17, which meshes with a gear-wheel 18 on one of the shafts 10. This gear-wheel 18 meshes directly with a corresponding gear-wheel on the other shaft 10.

By this arrangement of gearing the several shafts are operated to revolve in the directions indicated by the arrows in Fig. 3.

The shafts 6 6, 8 8, and 10 10 may be adjusted in horizontal planes toward and from each other—that is to say, one of the shafts 6, one of the shafts 8, and one of the shafts 10 may be adjusted toward the corresponding shafts on the opposite side of the machine to vary the space through which the meat passes vertically. This is accomplished, as heretofore explained, by means of the plates 2 and 3, which are provided with slotted lugs $a$, through which extend the adjusting-screws $b$. A very wide adjustment is not required; but the slots and the teeth of the gear-wheels may be so formed as to give any desired adjustment.

Preferably the blades 7 are arranged a little closer together than shown in Fig. 3; but they should never be arranged so close together or should not overlap to such an extent as to cut entirely through the meat fed into the machine.

Care is taken that both the blades 7 and the blades 9 shall only cut part way through the meat, forming, as it were, merely grooves therein and leaving a thin web to hold all the parts of the meat together. The meat when it leaves the machine is formed with grooves arranged at right angles with each other, dividing the meat on both sides into small squares or checks, and yet these squares or checks are held firmly together, so as not to drop apart, but the meat can be readily severed when desired. The meat in this way is made much tenderer, cooks better, and is more eatable.

The machine may be reversed—that is to say, the meat may be fed upwardly instead of downwardly. Sometimes it may be desirable to feed only a portion of the steak through the cutters. It will be observed that the feed-opening 4 is directly over the blades, so that the steak may be held in the hand of the operator and he may feed the lower portion of the steak between and through the cutters, then reverse the cutters, and pull the steak upwardly out of the opening 4. Below the blades is a drawer 19, into which the tendered meat falls from the cutters.

I claim as my invention—

1. A meat-tendering machine, comprising two gangs of circular cutters arranged to cut part way through the meat, but not to sever it into strips, two cylindrical gangs of longitudinal blades below the circular cutters, and also arranged to cut part way through the meat without severing it into strips, gearing for driving the circular blades, and longitudinal blades toward the center of the machine to feed the meat inwardly and downwardly between them, two shafts below the longitudinal blades and carrying guiding and cleaning blades geared to rotate in a direction opposite to the corresponding longitudinal blades above them, and to direct the meat inwardly and clear the longitudinal blades from meat adhering thereto, and mechanism for driving the cutters and blades in the proper direction.

2. A meat-tendering machine, comprising two gangs of circular cutters arranged to cut part way through the meat, but not to sever it into strips, two cylindrical gangs of longitudinal blades below the circular cutters, and also arranged to cut part way through the meat without severing it into strips, gearing for driving the circular blades, and longitudinal blades toward the center of the machine to feed the meat inwardly and downwardly between them, two shafts below the longitudinal blades and carrying guiding and cleaning blades geared to rotate in a direction opposite to the corresponding longitudinal blades above them, and to direct the meat inwardly and clear the longitudinal blades from meat adhering thereto, mechanism for driving the cutters and blades in the proper direction, and adjustable plates at opposite ends of the machine, carrying bearings for the shafts of the cutters and guiding and cleaning blades.

In testimony whereof I have signed this specification in the presence of two subscribing witnesses.

JESSE ELMER SNELLING.

Witnesses:
J. B. JONES,
THOS. F. WELTON.